(12) United States Patent
Liu

(10) Patent No.: US 10,728,661 B2
(45) Date of Patent: Jul. 28, 2020

(54) CAR AUDIO INFORMATION TRANSMITTER

(71) Applicant: Shenzhen Jiemeisi Industrial Co., Ltd., Shenzhen (CN)

(72) Inventor: Xiufang Liu, Shenzhen (CN)

(73) Assignee: SHENZHEN JIEMEISI INDUSTRIAL CO., LTD., Shenzhen (CN)

( * ) Notice: Subject to any disclaimer, the term of this patent is extended or adjusted under 35 U.S.C. 154(b) by 87 days.

(21) Appl. No.: 16/168,856

(22) Filed: Oct. 24, 2018

(65) Prior Publication Data
US 2020/0037071 A1 Jan. 30, 2020

(30) Foreign Application Priority Data
Jul. 27, 2018 (CN) .......................... 2018 2 1209763

(51) Int. Cl.
*H04R 3/04* (2006.01)
*B60Q 5/00* (2006.01)
*H04B 1/08* (2006.01)

(52) U.S. Cl.
CPC .............. *H04R 3/04* (2013.01); *B60Q 5/001* (2013.01); *H04B 1/082* (2013.01); *H04R 2420/07* (2013.01); *H04R 2420/09* (2013.01); *H04R 2499/13* (2013.01)

(58) Field of Classification Search
CPC .. H04B 1/082; H04B 1/3822; H04R 2499/15; H04R 3/04; H03G 5/165
USPC ..... 381/86, 103; 455/345, 344, 575.9, 569.2
See application file for complete search history.

(56) References Cited

U.S. PATENT DOCUMENTS

| 5,745,583 | A | * | 4/1998 | Koizumi | H03G 5/025 381/103 |
| 7,058,183 | B2 | * | 6/2006 | Hasegawa | H03G 3/32 381/103 |
| 7,346,326 | B2 | * | 3/2008 | Kim | H04B 1/40 381/103 |
| 7,400,859 | B2 | * | 7/2008 | Dayan | H04B 1/034 341/155 |
| 10,272,845 | B2 | * | 4/2019 | He | H04M 1/6091 |
| 2008/0227426 | A1 | * | 9/2008 | Lin | B60R 11/0247 455/345 |
| 2012/0163621 | A1 | * | 6/2012 | Riggs | H03G 3/3005 381/86 |
| 2014/0205262 | A1 | * | 7/2014 | Orito | H04N 5/76 386/231 |

(Continued)

*Primary Examiner* — Xu Mei

(57) ABSTRACT

The present disclosure relates to a car audio information transmitter, including: a main controller, an audio receiver, an audio, transforming module, a wireless transmitter, and a frequency adjustment module. The audio receiver connects to the main controller. The audio transforming module connects to the audio receiver and is configured to transform the audio signals. The wireless transmitter connects to the audio transforming module and is configured to transmit the transformed audio signals to a wireless receiver of a car. The frequency adjustment module connects to the audio transforming module and is configured to adjust a frequency of the audio signals. The car audio information transmitter is capable of accessing to the adjusting mode by one operation and adjusting an amplitude of the audio signals. As such, the complicated operations may be avoided, and the driving safety may be improved.

10 Claims, 4 Drawing Sheets

(56) References Cited

U.S. PATENT DOCUMENTS

2015/0264502 A1* 9/2015 Aoki .................. H04S 7/307
381/17

* cited by examiner

CAR AUDIO INFORMATION TRANSMITTER

CROSS REFERENCE TO RELATED APPLICATIONS

This application claims priority to Chinese Patent Application No. 201821209763.7, filed Jul. 27, 2018, which is hereby incorporated by reference herein as if set forth in its entirety.

FIELD OF THE INVENTION

The present disclosure relates to car equipment field, and more particularly to a car audio information transmitter.

BACKGROUND OF THE INVENTION

Some of the cars are not equipped with the Bluetooth receiver, and users may not be able to adjust the equalization of the audio information, such as music, via the Bluetooth interface. If the users want to adjust the modes of the music, the users need to access to the menu of the mobile device to select the modes, which may be dangerous when driving.

DETAILED DESCRIPTION OF PREFERRED EMBODIMENTS

In order to explain the technical solution of the present disclosure more clearly, and completely, the present disclosure will be further described in accompanying with the drawings.

Figure 1:
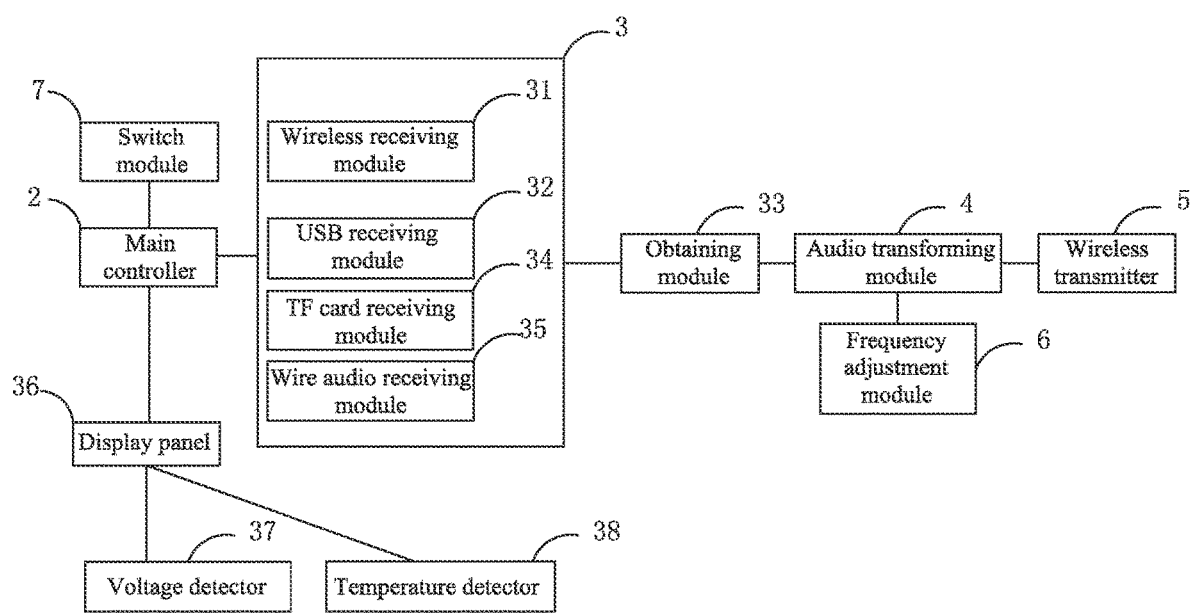
FIG. 1 is a block diagram of a car audio information transmitter in accordance with one embodiment of the present disclosure.
Figure 2:
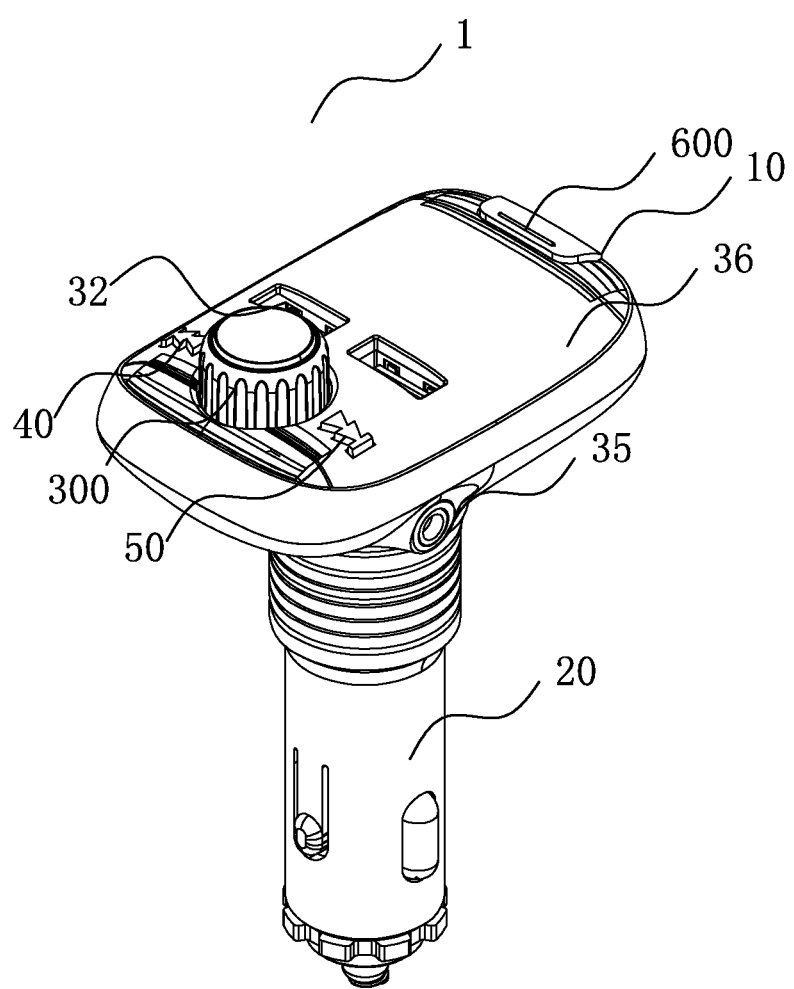
FIG. 2 is a schematic view of the car audio information transmitter shown in FIG. 1.

Referring to FIG. 1 and FIG. 2, in one aspect, the present disclosure relates to a car audio, information transmitter 1, including: a main controller 2, an audio receiver 3, an audio, transforming module 4, a wireless transmitter 5, a frequency adjustment module 6, and a switch module 7. The audio receiver 3 connects to the main controller 2 and at least one mobile device, and the audio receiver 3 is configured to receive audio signals transmitted from the mobile device. The audio transforming module 4 connects to the audio receiver 3, and the audio transforming module 4 is configured to transform the audio signals. The wireless transmitter 5 connects to the audio transforming module 4, and the wireless transmitter 5 is configured to transmit the transformed audio signals to a wireless receiver of a car. The frequency adjustment module 6 connects to the audio transforming module 4, and the frequency adjustment module 6 is configured to adjust a frequency of the audio signals. The switch module 7 is connected to the main controller 2, and the switch module 7 is configured to turn on or turn off the frequency adjustment module 6.

In one example, the operation principle of the car audio information transmitter 1 is described in below.

When users play music in the car via the mobile device, such as a cellphone or a portable music player, and the mobile device is equipped with a Bluetooth transmitter, the audio signals may be transmitted to the car audio information transmitter 1. The audio signals may be received by the audio receiver 3 of the car audio information transmitter 1, and may be transformed into the audio signals, which are capable of being transmitted via the wireless transmitter 5, by the audio transforming module 4. The transformed audio signals may be transmitted to the wireless receiver of the car by the wireless transmitter 5. A car stereo connected to the wireless receiver of the car may be able to play the audio signals. The users may adjust an equalization of the music by adjusting a frequency of sound signals or a frequency of a portion of the sound signals in the audio signals via the frequency adjustment module 6, so as to enhance the specific frequency of the portion of the sound signals in the audio signals. Specifically, the frequency adjustment module 6 is configured to, reduce or to increase the frequency of the sound signals in the audio signals. A default setting of the frequency adjustment module 6 may depend on demands of the users. The switch module 7 is configured to turn on a function of adjusting the frequency of the audio signals of the frequency adjustment module 6. The users may operate the switch module 7 by a button, a touch screen, or a push button on the car audio information transmitter 1. An adjusting-by-one-operation function, i.e., the audio signals may be adjusted by one simple operation of the button, the touch screen, or the push button, may be achieved by configuring a relation between an operating motion of the button, the touch screen, the push button, and an operation statues of the switch module 7. For example: (1) With respect to the button. The switch module 7 may be operated to turn on the frequency adjustment module 6 by pressing the button for one time to reduce the frequency of the audio signals, i.e., a heavy bass mode may be turned on by one operation. The switch module 7 may be operated to turn on the frequency adjustment module 6 by pressing the button for two times to increase the frequency of the audio signals, i.e., a treble mode may be turned on by one operation. (2) With respect to the touch screen. The frequency adjustment module 6 may be turned on via a gesture operation, and the different modes may be selected by operating different gesture operations. (3) With respect to the push button. The push button may be pushed to a left to operate the switch module 7, and to reduce the frequency of the audio signals, i.e., the heavy bass mode may be turned on by one operation. The push button may be pushed to a right to operate the switch module 7, and to increase the frequency of the audio signals, i.e., the treble mode may be turned on by one operation.

In view of the above, the audio receiver 3 is configured to receive music information from the mobile device or a storage device. The music information may be transformed into the audio signals, which are capable of being transmitted via the wireless transmitter 5, by the audio transforming module 4. The transformed audio signals may be transmitted to the wireless receiver of the car by the wireless transmitter 5. Such that, the cars without the Bluetooth receiver may be able to play the music stored in the mobile device. In addition, by configuring the frequency adjustment module 6 and the switch module 7, the users may adjust the frequency to, enhance a performance of heavy bass sounds or a performance of treble sounds in the audio signals by one operation via the switch module 7.

Specifically, the wireless receiver may be a wireless frequency modulation (FM) receiver. For example, a radio of the car.

The frequency adjustment module 6 is configured to obtain a portion of the audio signals, which have a frequency less than a predetermined frequency, and to adjust the frequency of the portion of the audio signals. The users often want to enhance the performance of the heavy bass sounds when listening to the music with the heavy bass sounds. Thus, the frequency adjustment module 6 is configured to obtain the audio signals having a low frequency and to adjust the frequency of the audio signals to a frequency even lower than the low frequency, so as to enhance the performance of the heavy bass sounds. For example, the frequency adjustment module 6 is configured to obtain the audio signals having the frequency less than 200 Hz, and to adjust the frequency of the audio signals to 150 Hz, so as to enhance the performance of the heavy bass sounds. The frequency may be adjusted via a predetermined method, such as multiplying the frequency by a coefficient to obtain the adjusted frequency. When the user presses the button connected to the switch module 7, the switch module 7 may control the frequency adjustment module 6 to obtain the audio signals having the frequency less than the predetermined frequency. The frequency is multiplied by the coefficient less than 1 to obtain the audio signals with the adjusted frequency. The audio signals with the adjusted frequency may be outputted and played.

The frequency adjustment module 6 is configured to obtain the audio signals, which have the frequency greater than the predetermined frequency, and to adjust the frequency of the audio signals. The users often want to enhance a performance of vocal sounds when listening to the music with vocal. Thus, the frequency adjustment module 6 is configured to obtain the audio signals having a high frequency and to adjust the frequency of the audio signals to a frequency even greater than the high frequency, so as to enhance the performance of the vocal sounds. For example, the frequency adjustment module 6 is configured to obtain the audio signals having the frequency greater than 200 Hz, and to adjust the frequency of the audio signals, to 250 Hz, so as to enhance the performance of the vocal sounds. When the user presses the button connecting to the switch module 7, the switch module 7 may control the frequency adjustment module 6 to obtain the audio signals having the frequency greater than the predetermined frequency. The frequency is multiplied by the coefficient greater than 1 to obtain the audio signals with the adjusted frequency. The audio signals with the adjusted frequency may be outputted and played. In one example, the car audio information transmitter 1 may include a main body 10 and a connector 20 configured on a bottom of the main body 10. The connector 20 is connected to a power socket of the car. The main body 10 has a rotational button 300, a previous-song button 40, a next-song button 50, and a frequency-adjusting button 600. The rotational button 300, the previous-song button 40, the next-song button 50, and the frequency-adjusting button 600 are connected to the main controller 2 to control the music. The frequency-adjusting button 600 is configured to control the switch module 7 and to control the frequency adjustment module 6. When the user operates the frequency-adjusting button 600, the frequency adjustment module 6 may adjust the frequency of the audio signals. When the user restores the frequency-adjusting button 600, the audio signals may be resumed and be played normally.

Figure 3:
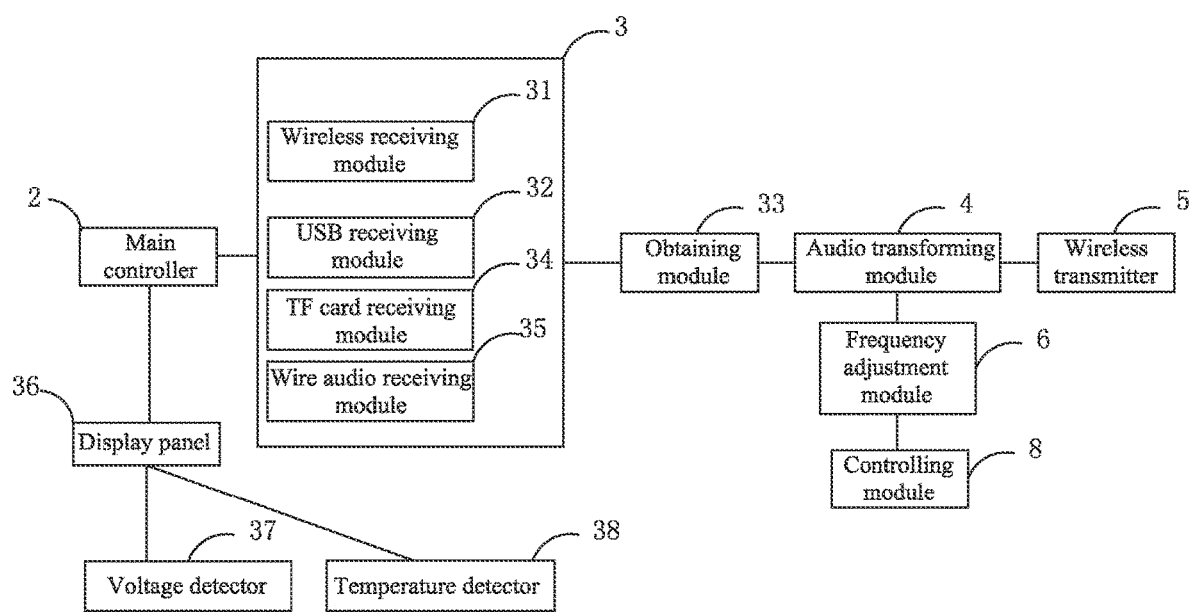
FIG. 3 is a block diagram of the car audio information transmitter in accordance with another embodiment of the present disclosure.
Figure 4:
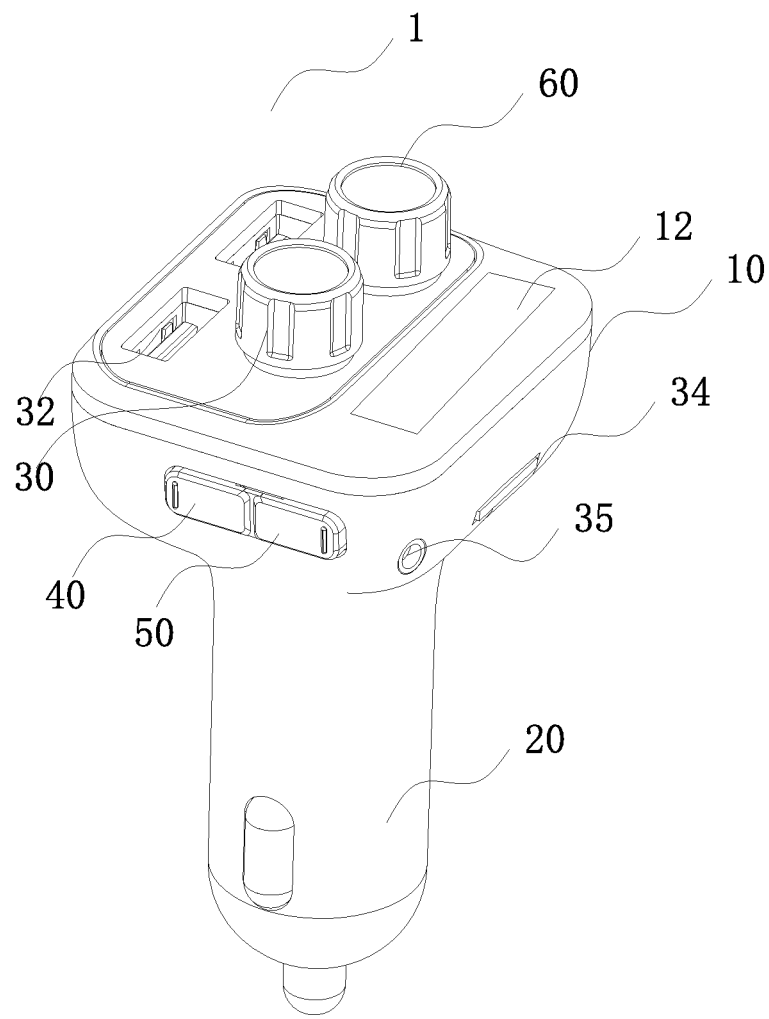
FIG. 4 is a schematic view of the car audio information transmitter shown in FIG. 3.

Referring to FIG. 3 and FIG. 4, in another aspect, the present disclosure relates to the car audio information transmitter 1, including: the main controller 2, the audio receiver 3, the audio transforming module 4, the wireless transmitter 5, the frequency adjustment module 6, and a controlling module 8. The audio receiver 3 connects to the main controller 2 and the mobile device, and the audio receiver 3 is configured to receive the audio signals transmitted from the mobile device. The audio transforming module 4 connects to the audio receiver 3, and the audio transforming module 4 is configured to transform the audio signals. The wireless transmitter 5 connects to the audio transforming module 4, and the wireless transmitter 5 is configured to transmit the transformed audio signals to the wireless receiver of the car. The frequency adjustment module 6 connects to the audio transforming module 4, and the frequency adjustment module 6 is configured to adjust the frequency of the audio signals. The controlling module 8 is connected to the frequency adjustment module 6, and the controlling module 8 is configured to adjust an amplitude of the frequency adjustment module 6. A shell of the car audio information transmitter 1 may include a knob 30 connected to the controlling module 8. The amplitude is adjusted in response to a rotation stroke of the knob 30.

In one example, the operation principle of the car audio information transmitter 1 is described in below.

When users play the music in the car via the mobile device, such as the cellphone or the portable music player, and the mobile device is equipped with the Bluetooth transmitter, the audio signals may be transmitted to the car audio information transmitter 1. The audio signals may be received by the audio receiver 3 of the car audio information transmitter 1 and may be transformed into the audio signals, which are capable of being transmitted via the wireless transmitter 5, by the audio transforming module 4. The transformed audio signals may be transmitted to the wireless receiver of the car by the wireless transmitter 5. The car stereo connected to the wireless receiver of the car may be able to play the audio signals. The users may adjust the equalization of the music by adjusting the frequency of the sound signals or the frequency of the portion of the sound signals in the audio signals via the frequency adjustment module 6, so as to enhance the specific frequency of the portion of the sound signals in the audio signals. Specifically, the frequency adjustment module 6 is configured to reduce or to increase the frequency of the sound signals in the audio signals. The default setting of the frequency adjustment module 6 may depend on demands of the users. The controlling module 8 is configured to control the frequency adjustment module 6 to adjust the amplitude of the audio signals. The amplitude indicates to further enhance or to further reduce the performance of the heavy bass sounds or the performance of the treble sounds. The user may operate the controlling module 8 via the knob of the car audio information transmitter 1. The adjusting-by-one-operation function, i.e., the audio signals may be adjusted by one simple operation of the knob, may be achieved by configuring a relation between a rotational operating motion of the knob and an operation statues of the controlling module 8.

In view of the above, the audio receiver 3 is configured to receive the music information from the mobile device or the storage device. The music information may be transformed into the audio signals, which are capable of being transmitted via the wireless transmitter 5, by the audio transforming module 4. The transformed audio signals may be transmitted to the wireless receiver of the car by the wireless transmitter 5. Such that, the cars without the Bluetooth receiver may be able to play the music stored in the mobile device. In addition, by configuring the frequency adjustment module 6 and the controlling module 8, the users may adjust the frequency to enhance the performance the heavy bass sounds or the performance of the treble sounds in the audio signals by one operation via the controlling module 8. In addition, the user may enhance or reduce the amplitude of the frequency adjustment module 6 via the controlling module 8. The amplitude indicates to further enhance or to further reduce the performance of the heavy bass sounds or the performance of the treble sounds. As such, the user experience may further be improved.

Specifically, the wireless receiver may be the wireless FM receiver. For example, the radio of the car. The controlling module 8 may be a potentiometer.

The frequency adjustment module 6 is configured to obtain the portion of the audio signals, which have the frequency less than the predetermined frequency, and to adjust the frequency of the portion of the audio signals. The users often want to enhance the performance of the heavy bass sounds when listening to the music with the heavy bass sounds. Thus, the frequency adjustment module 6 is configured to obtain the audio signals having the low frequency and to adjust the frequency of the audio signals to the frequency even lower than the low frequency, so as to enhance the performance of the heavy bass sounds. For example, the frequency adjustment module 6 is configured to obtain the audio signals having the frequency less than 200 Hz, and to adjust the frequency of the audio signals to 150 Hz, so as to enhance the performance of the heavy bass sounds. The frequency is multiplied by the coefficient less than 1 to obtain the adjusted frequency. When the user rotates the knob connected to the controlling module 8 along a first rotational direction to increase the rotational stroke, the coefficient becomes less, the adjusted frequency of the audio signals becomes lower, and the heavy bass sounds may further be enhanced. When the user rotates the knob along a second direction to increase the rotational stroke, the coefficient becomes greater and closer to 1, and the performance of the heavy bass sounds may be reduced. In one example, the first rotational direction may be clockwise, and the second rotational direction may be counterclockwise. In another example, the first rotational direction may be counterclockwise, and the second rotational direction may be clockwise.

The frequency adjustment module 6 is configured to obtain the audio signals, which have the frequency greater than the predetermined frequency, and to adjust the frequency of the audio signals. The users often want to enhance the performance of the vocal sounds when listening to the music with the vocal. Thus, the frequency adjustment module 6 is configured to obtain the audio signals with the high frequency and to adjust the frequency of the audio signals to the frequency even greater than the high frequency, so as to enhance the performance of the vocal sounds. For example, the frequency adjustment module 6 is configured to obtain the audio signals having the frequency greater than 200 Hz, and to adjust the frequency of the audio signals to 250 Hz, so as to enhance the performance of the vocal sounds. The frequency is multiplied by the coefficient greater than 1 to obtain the adjusted frequency. When the user rotates the knob connected to the controlling module 8 along the first rotational direction to increase the rotational stroke, the coefficient becomes greater, the adjusted frequency of the audio signals becomes greater, and the performance of the treble sounds may further be enhanced. When the user rotates the knob along the second direction to increase the rotational stroke, the coefficient becomes less and closer to 1, and the performance of the treble sounds may be reduced.

In one example, the car audio information transmitter 1 may include the main body 10 and the connector 20 configured on the bottom of the main body 10. The connector 20 is connected to the power socket of the car. The main body 10 has a first knob 30, the previous-song button 40, the next-song button 50, and a second knob 60. The first knob 30, the previous-song button 40, the next-song button 50, and the second knob 60 are connected to the main controller 2 to control the music. The first knob 30 is configured to operate the controlling module 8 and to control the frequency adjustment module 6.

In one example, the audio receiver 3 may be a wireless receiving module 31 connected to the mobile device via a Bluetooth connection. The wireless receiving module 31 is configured to receive the audio signals via the Bluetooth connection. The car audio information transmitter 1 may be equipped with the Bluetooth receiver, as such, the problem that the car cannot connect to the mobile device due to the car has no Bluetooth receiver may be solved.

In another example, the audio receiver 3 may be an universal serial bus (USB) receiving module 32. The USB receiving module 32 may connect to an USB, and is configured to receive the audio signals from the USB. Specifically, the audio receiver 3 may further include an obtaining module 33 connected to the USB receiving module 32. The user may connect the USB to the USB receiving module 32. The obtaining module 33 may search the audio signals from the USB and may transmit the audio signals to the audio transforming module 4. The audio signals may be transmitted to the wireless transmitter 5 and may be played.

In another example, the audio receiver 3 may be a trans-flash (TF) card receiving module 34. The TF card receiving module 34 connects to an TF card, and is configured to receive the audio signals from the TF card. Specifically, the audio receiver 3 may further include the obtaining module 33 connected to the TF card receiving module 34. The user may connect the TF card to the TF card receiving module 34. The obtaining module 33 may search the audio signals from the TF card and may transmit the audio signals to the audio transforming module 4. The audio signals may be transmitted to the wireless transmitter 5 and may be played.

In another example, the audio receiver 3 may be a wire audio receiving module 35. The wire audio receiving module 35 connects to the mobile, device, and is configured to receive the audio signals from the mobile device. Specifically, the audio receiver 3 may further include the obtaining module 33 connected to the wire audio receiving module 35. The user may connect an audio wire of the mobile device to the wire audio receiving module 35. The obtaining module 33 may search the audio signals from the mobile device and may transmit the audio signals to the audio transforming module 4. The audio signals may be transmitted to the wireless transmitter 5 and may be emitted.

In one example, one or more of the wireless receiving module 31, the USB receiving module 32, the TF card receiving module 34, and the wire audio receiving module 35 may be integrated in one car audio information transmitter 1.

In one example, the car audio information transmitter 1 may further include a display panel 36 connected to the main controller 2. The display panel 36 is configured to display music information.

In one example, the car audio information transmitter 1 may further include a voltage detector 37 connected to the display panel 36. The voltage detector 37 is configured to detect a voltage of a car power. The display panel 36 is configured to display voltage information.

In one example, the car audio information transmitter 1 may further include a temperature detector 38 connected to the display panel 36. The temperature detector 38 is configured to detect a temperature. The display panel 36 is configured to display temperature information.

Above are embodiments of the present invention, which does not limit the scope of the present invention. Any equivalent amendments within the spirit and principles of the embodiment described above should be covered by the protected scope of the invention.

What is claimed is:

1. A car audio information transmitter, comprising:
   a main controller;
   an audio receiver being connected to the main controller and at least one mobile device, wherein the audio receiver is configured to receive audio signals from the mobile device;
   an audio transforming module being connected to the audio receiver, wherein the audio transforming module is configured to transform the audio signals;
   a wireless transmitter being connected to the audio transforming module, wherein the wireless transmitter is configured to transmit the transformed audio signals to a wireless receiver of a car;
   a frequency adjustment module being connected to the audio transforming module, wherein the frequency adjustment module is configured to adjust a frequency of the audio signals;
   a switch module being connected to the main controller, wherein the switch module is configured to turn on or turn off the frequency adjustment module, and the switch module is turned on or off by a frequency-adjusting button of a main body; and
   a controlling module being connected to the frequency adjustment module, wherein the controlling module is configured to adjust an amplitude of the frequency adjustment module;
   wherein the audio signals comprise sound signals, the frequency adjustment module is configured to obtain a portion of the sound signals, having the frequency greater than a first predetermined frequency or less than a second predetermined frequency, in the audio signals and to adjust the frequency of the sound signals to enhance a performance of the portion of the sound signals; and
   wherein a shell of the car audio information transmitter comprises a knob being connected to the controlling module, and the amplitude is adjusted in response to a rotation of the knob.

2. The car audio information transmitter according to claim 1, wherein the frequency adjustment module is configured to:
   obtain the sound signals having a frequency less than a first predetermined frequency and adjust the frequency of the sound signals to enhance or to reduce an amplitude of heavy bass sounds;
   obtain the sound signals having the frequency greater than a second predetermined frequency and adjust the frequency of the audio signals to enhance or to reduce an amplitude of treble sounds; and
   wherein the amplitude is increased in response to a clockwise rotation of the knob, and the amplitude is decreased in response to a counter-clockwise rotation of the knob.

3. The car audio information transmitter according to claim 1, wherein the audio receiver is configured to receive the audio signals from the at least one of mobile device via a wired/wireless communication, an universal serial bus (USB), and a trans-flash (TF) card.

4. The car audio information transmitter according to claim 1, wherein the car audio information transmitter further comprises a display panel being connected to the main controller, and the display panel is configured to display music information.

5. The car audio information transmitter according to claim 4, wherein the car audio information transmitter further comprises a voltage detector being connected to the display panel, the voltage detector is configured to detect a voltage of a car power, and the display panel is configured to display voltage information.

6. The car audio information transmitter according to claim 4, wherein the car audio information transmitter further comprises a temperature detector being connected to the display panel, the temperature detector is configured to detect a temperature, and the display panel is configured to display temperature information.

7. The car audio information transmitter according to claim 1, wherein the car audio information transmitter further comprises a button, the switch module is operated to turn on the frequency adjustment module by pressing the button for one time to reduce the frequency of the audio signals, and the switch module is operated to turn on the frequency adjustment module by pressing the button for two times to increase the frequency of the audio signals.

8. The car audio information transmitter according to claim 1, wherein the car audio information transmitter further comprises a touch screen, the frequency adjustment module is turned on via a gesture operation on the touch screen, and different modes are selected by operating different gesture operations on the touch screen.

9. The car audio information transmitter according to claim 1, wherein the car audio information transmitter further comprises a push button, the push button is pushed to a left to operate the switch module and to reduce the frequency of the audio signals, and the push button is pushed to a right to operate the switch module and to increase the frequency of the audio signals.

10. The car audio information transmitter according to claim 1, wherein the car audio information transmitter further comprises a connector configured on a bottom of the main body and connected to a power socket of the car, and the audio receiver is configured on the main body; and
    the main body further comprises a previous-song button and a next-song button, the previous-song button and the next-song button are connected to the main controller to control a music.

\* \* \* \* \*